United States Patent [19]

Welhouse

[11] Patent Number: 5,471,731
[45] Date of Patent: Dec. 5, 1995

[54] METHOD OF MAKING LOW-FAT NON-STICK FRYING DEVICE

[75] Inventor: Harold L. Welhouse, Two Rivers, Wis.

[73] Assignee: Anchor Hocking Corporation, Freeport, Ill.

[21] Appl. No.: 223,791

[22] Filed: Apr. 6, 1994

Related U.S. Application Data

[63] Continuation-in-part of Ser. No. 55,490, Apr. 30, 1993.

[51] Int. Cl.⁶ ..................................................... B21B 1/46
[52] U.S. Cl. ............................................ 29/527.4; 72/197
[58] Field of Search ............................ 29/527.4; 72/197; 99/425; 126/390

[56] References Cited

U.S. PATENT DOCUMENTS

| | | | |
|---|---|---|---|
| 1,807,141 | 5/1931 | Wood | 72/197 |
| 3,188,734 | 6/1965 | Davis, Jr. | 29/527.4 X |
| 3,383,293 | 5/1968 | Matthews et al. | 29/527.4 X |
| 3,696,503 | 10/1972 | Krengel et al. | 29/527.4 |
| 3,825,993 | 7/1974 | McGinnis et al. | 29/527.4 X |
| 4,347,722 | 9/1982 | Ulam | 72/197 X |
| 4,926,843 | 5/1990 | Vocke et al. | 29/527.4 X |

Primary Examiner—Carl J. Arbes
Attorney, Agent, or Firm—Baker & McKenzie

[57] ABSTRACT

An improved one-sided embossing process for manufacturing low-fat non-stick frying cookware is provided. The process provides a textured cooking surface free of sharp edges which increases the useful life of a non,stick coating applied thereto. The embossed cooking surface of the resulting frying device comprises a series of wave-like grooves embossed in the surface of the pan. The wave-like pattern of each groove is one-half G cycle out of phase with its neighboring adjacent grooves to form an alternating pattern of outwardly extending lands and inwardly extending roots. A raised portion or elevated surface is provided on the cooking surface disposed between the outwardly extending lands. The elevated surface is the primary cooking surface and is further the location of the inevitable initial wearing of the non-stick material. The remaining non-stick material, disposed in the grooves and between the roots is not subject to abrasive action and wears at a substantially slower rate. The raised portions or elevated cooking surfaces disposed between the lands comprise less than 30 percent of the upper cooking surface and therefore less than 30 percent of the nonstick coating disposed on the upper cooking surface is exposed to the abrasive action of cooking utensils or cleaning utensils.

12 Claims, 3 Drawing Sheets

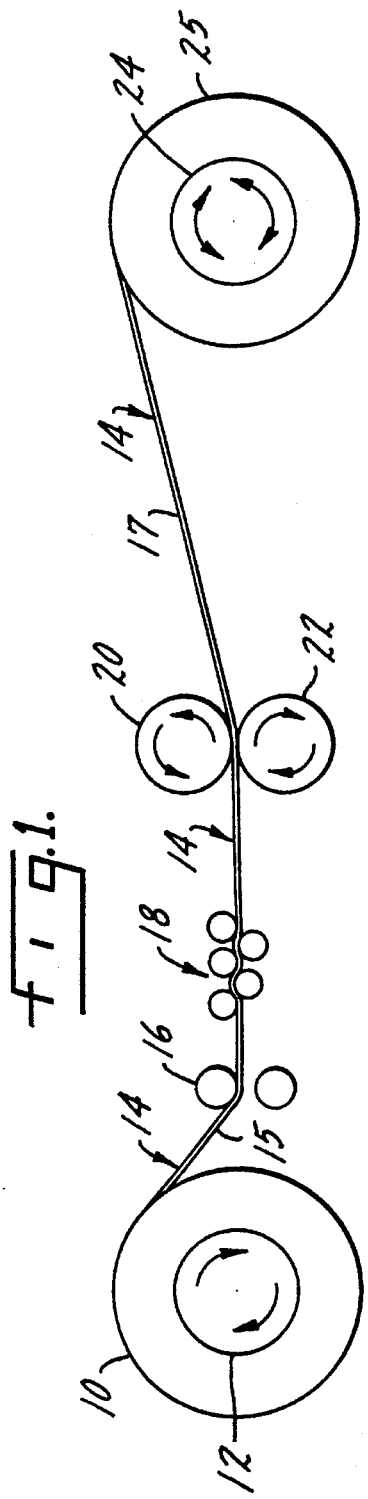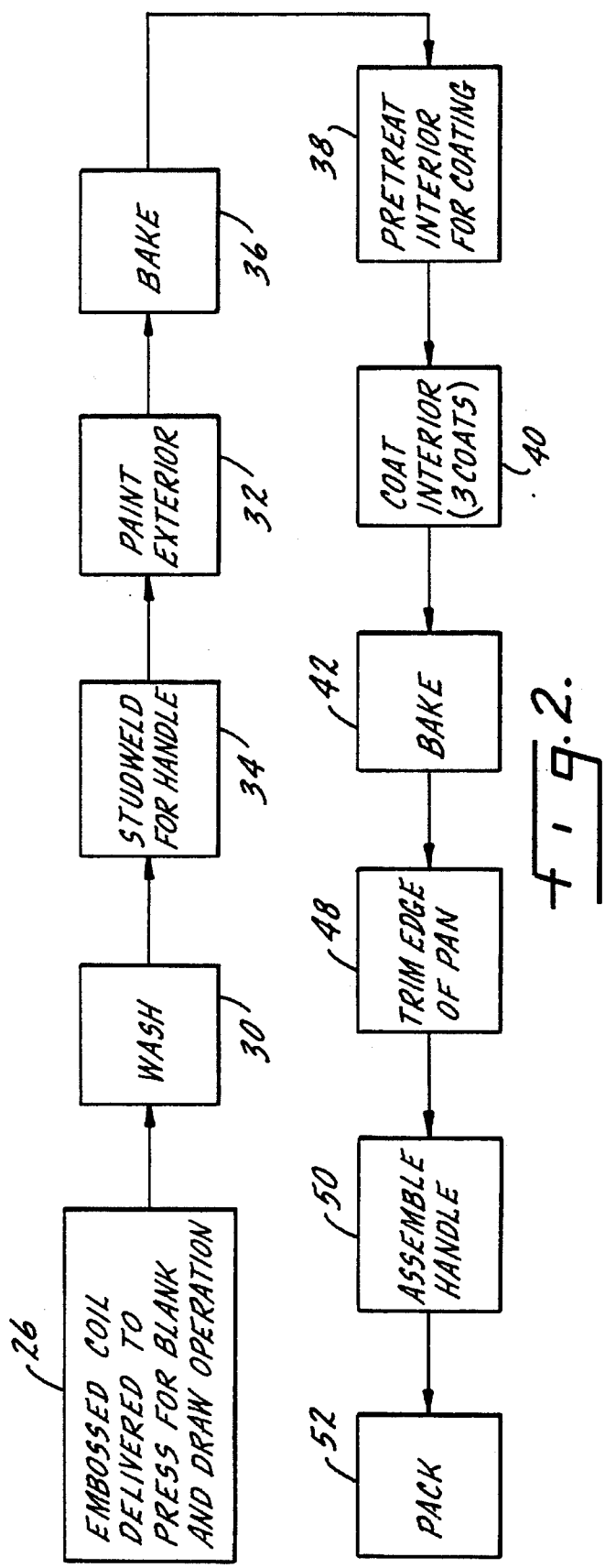

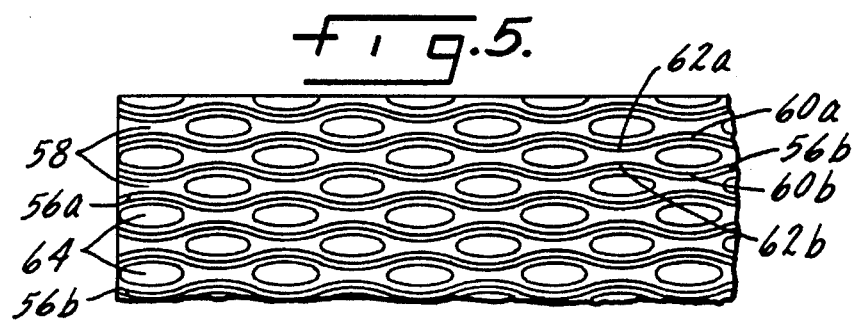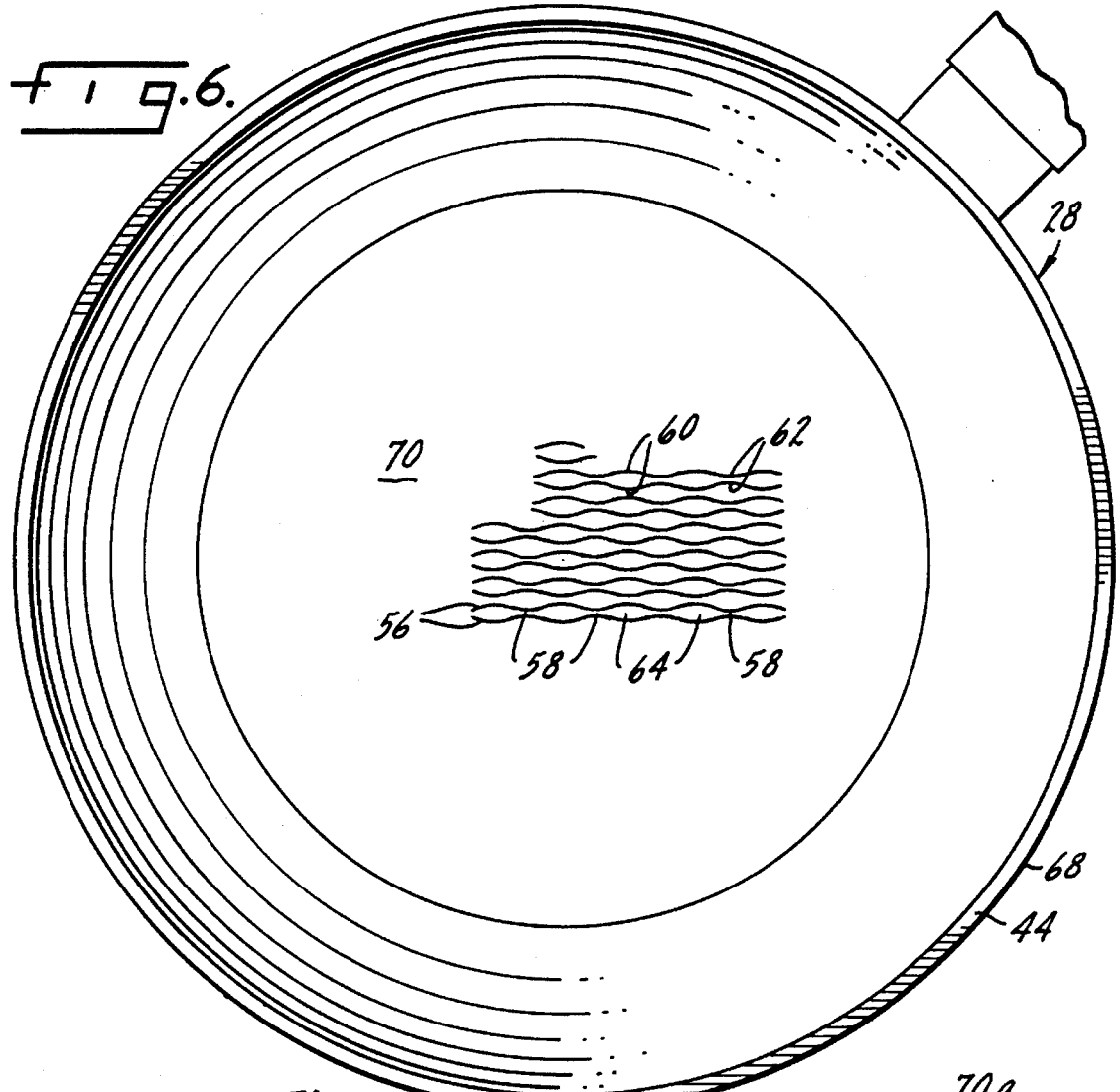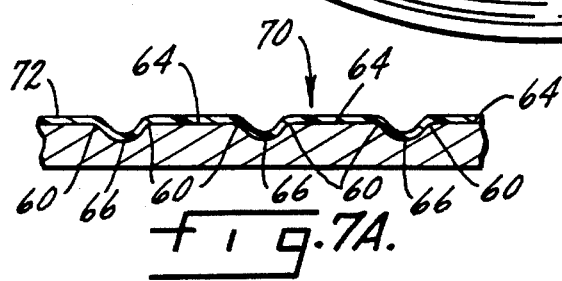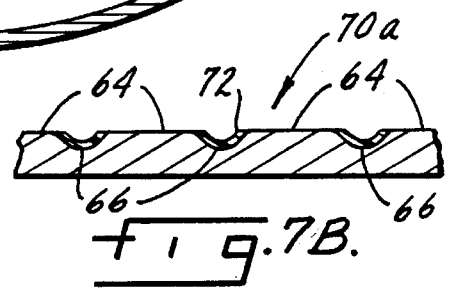

METHOD OF MAKING LOW-FAT NON-STICK FRYING DEVICE

This Application is a continuation-in-part of U.S. Pat. application No. 08/055,490, filed on Apr. 30, 1993.

FIELD OF THE INVENTION

This invention relates generally to cookware methods of manufacturing cookware and specifically to a method of manufacturing cookware with a non-stick coating applied to a textured cooking surface. The configuration of the textured cooking surface at the present invention provides increased life and enhanced usage for the non-stick coating as compared to conventional textured cooking surfaces.

BACKGROUND OF THE INVENTION

It has long been an objective of cookware manufacturers to provide cookware having improved strength, improved resistance to heat deformation, as well as the ability to hide scratches, minor dents and other deformations. For these purposes, textured cooking surfaces are known and used. Textured cooking surfaces have also been provided for the drainage of fat and grease away from the food to lower the fat and cholesterol content of the cooked food. Textured cooking surfaces enable a cook to effectively fry food in a minimal amount of fat or grease. In recent years, non-stick coatings are frequently applied to the cooking surface to provide ease of use and make the cookware easier to clean.

However, the effectiveness of the currently available textured cookware has been compromised by current manufacturing techniques. Specifically, it is inherently difficult to manufacture a textured cooking surface which does not have sharp edges which tend to bind or catch a spatula or a cleaning utensil. The sharp edges are caused by the stamping, coining or pressing processes that are currently used to inscribe the textured pattern into the cooking surface. The sharp edges caused by the manufacturing processes are especially disadvantageous because the non-stick coating disposed on these sharp edges wears quickly and therefore the benefits provided by the non-stick coating are compromised. At least 50% of the surface area of conventional textured cooking surfaces can be adversely affected by the sharp edges and the premature wearing of the non-stick coating.

Accordingly, the primary drawback found in textured cookware surfaces taught by the prior art, i.e. sharp edges and lack of durability of the non-stick coating, lies in the manufacturing processes. As noted above, the manufacturing processes currently used to fabricate textured cookware employ stamping, coining or pressing operations.

In contrast, embossing has not been employed for manufacturing textured cookware for two reasons. First, embossing has been traditionally a two-sided process, meaning the surface texture is applied to both sides of the material. Second, traditional embossing techniques cannot be utilized with the relatively thick gauge metal (0.098"–0.128") required for cookware applications; embossing is traditionally performed on materials that are lighter in gauge than materials normally used to manufacture cookware. For example, traditional embossing is carried out on materials having a thickness of no greater than 0.064" or thinner. Further, embossing is normally carried out with matching textured rollers to provide the surface texture on both sides in the material.

Thus, practitioners in the art of cookware have not been very successful at combining non-stick coatings with textured cooking surfaces and there is a need for such an effective combination. Preferably, the textured surface would provide for low-fat or non-fat cooking and would also be of a geometrical configuration that would hold a non-stick coating for an extended period of time. Further, it would be highly preferable for the textured surface to retain its non-stick capabilities after portions of the non-stick coating have worn off. Such wear is inevitable, even with non-textured cooking surfaces. If an effective non-stick coating/textured surface combination could be provided by an effective manufacturing process, the result would have an improved textured cooking surface with an improved non-stick coating with a longer effective lifespan.

SUMMARY OF THE INVENTION

The invention is an improved textured cooking surface with a non-stick coating made with a novel one-sided embossing process. The coating has a substantially increased lifespan as compared to coated surfaces disposed on conventional textured cookware.

The improved method of manufacturing textured cookware provided by the present invention is as follows. Metal used in fabricating the cookware body is provided in coil or roll form. The roll is rotated thereby releasing a sheet of metal that may be fed through a breaker roll to remove the coil or spring from the metal. Also, the metal may be fed through flattening rollers before it is passed through the embossing rollers. The opposing embossing rollers include a textured roller with the textured pattern to be embossed on one side of the metal. The opposing roller is smooth. The textured roller is motor driven and the smooth roller is undriven. The smooth roller is maintained in a smooth condition with a scraper blade positioned to keep the smooth roller free of slitter hairs, oxides and metal fines deposited from the metal coil. The pressure between the two opposing embossing rollers may be controlled hydraulically. The textured surface is embossed on one side of the metal and the metal sheet, now in the form of a textured strip, can be wound on a power driven recoiler. The power driven recoiler is helpful to create tension across the metal so that the metal sheet is fed through the embossing rollers under tension.

After the textured strip is rolled into a coil to form an embossed coil, the embossed coil is ready to be delivered to a press for the blank and draw operation which forms the shape of the cookware. The cookware is washed with acid or caustic solution before the exterior is painted and baked for curing. The interior surface of the cookware is then pretreated for coating and then coated with at least one coat of non-stick material before the pan is baked to cure the non-stick material. The upper edge of the pan is trimmed before the handle is attached to the pan and then the finished cookware is packed and made ready for shipment to retail outlets.

Thus, the textured surface provided by the present invention is applied via a unique one-sided embossing technique that includes the substitution of a smooth roller on one side in place of the normal two matching textured rollers used for two-sided texture applications. The one-sided embossing process is preferably carried out so that penetration of the textured pattern is limited to approximately 0.008" which results in a smooth, undulating effect which does not provide sharp edges for the entrapment of food articles. The result is an improved, textured non-stick coated surface.

The one-sided embossing process results in a cooking surface which is easily and readily cleanable, because of less surface exposure to foods, and in which there is an easier release of foods as a result of the elimination of corners or sharp edges which tend to collect food. Further, the construction of the cooking surface is such that a lesser amount of oils are required to effectively fry food, and thereby the food prepared on the cookware tends to be healthier due to the lower fat content than fried food prepared on conventional surfaces.

One preferred textured cooking surface that can be applied with the one-sided embossing process of the present invention includes a series of adjacent curvilinear grooves that are fairly narrow in width and fairly narrow in depth. The grooves are disposed adjacent to each other in a side-by-side or juxtaposed fashion. Each groove includes a repeating pattern of oppositely directed undulations. The repeating pattern of undulations for each groove is approximately one-half of a cycle out of sync or out of phase with the adjacent groove. That is, two adjacent grooves can be characterized as a series of alternating roots and lands, the lands of two adjacent grooves being two undulations directed away from each other and the roots of two adjacent grooves being two undulations directed toward one another. Each set of two lands is disposed between adjacent sets of two roots. The result is a pattern of alternating roots and lands between any two adjacent grooves.

Another way to describe this pattern is a series of low amplitude sinusoidal grooves disposed in the upper surface of the pan. Each sinusoidal groove is disposed between two adjacent sinusoidal grooves. Each groove is one-half of a cycle or 180° out of phase with each adjacent groove. The resulting pattern requires a positive undulation of each groove to be matched with a negative undulation of an adjacent groove. Such a pair forms two outwardly directed lands. Further, a negative undulation of each groove is paired with a positive undulation of an adjacent groove. Such a pair forms two inwardly directing undulations form two roots of two adjacent grooves. The result is two adjacent grooves forming a pattern of oppositely directed lands disposed between inwardly directed roots. The pattern applies for any two adjacent grooves.

The area disposed between two oppositely directed lands provides an elevated surface or raised portion that is disposed at a higher elevation than the bottom of the grooves and at a higher elevation than the portions of the cooking surface disposed between two inwardly directing roots. In the preferred embodiment, these raised portions, which can also be thought of as plateaus, are of an elliptical or oblong in configuration. The surface area represented by these elliptical raised portions is less than one-third and preferably less than 30% of the total surface area provided by the coated textured cooking surface.

A non-stick cooking material is applied evenly to the entire cooking surface of the pan. Because the raised portions disposed between adjacent outwardly directed lands are disposed above the remainder of the cooking surface, these raised portions engage cooking and cleaning utensils with a higher frequency and a higher intensity than the remainder of the cooking surface. Accordingly, the non-stick cooking material will wear first from these raised portions. However, the non-stick capabilities of the frying pan are not unduly compromised by the wearing of the non-stick material from the raised portions disposed between the lands.

As will be shown below, the raised portions created by the one-sided embossing process comprise less than ⅓ and preferably less than 30% and even more preferably less than 27% of the total surface area of the upper cooking surface. Thus, a wearing of the non-stick cooking material from a mere 30 or 27 percent of the total cooking surface will not unduly compromise the total non-stick qualities of the pan. Food will still engage the remaining non-stick cooking material disposed between two roots and in the grooves. Because non-stick cooking material will still coat at least 70 percent of the cooking surface of the pan, the pan still has effective non-stick capabilities and is easy to clean. Further, food is more likely to get stuck or caught in the grooves and between two roots and therefore the non-stick material will last the longest on those areas of the cooking surface where the non-stick material is needed most.

Thus, the frying pan of the present invention is more durable in that it retains its non-stick qualities longer than conventional pans that combine non-stick surfaces with textured surfaces. As with other devices taught in the prior art, the non-stick material will wear. However, the non-stick material will wear on a small fraction of the total cooking surface and further the non-stick material is retained in the surfaces where the non-stick material is needed most: namely the narrow areas between the roots and in the grooves where food is most likely to get lodged.

The one-sided embossing method provided by the present invention represents a substantial improvement over the coining, stamping or pressing methods taught by the prior art. The one-sided embossing method of the present invention provide the undulating upper surface which includes the raised portions that comprise less than ⅓ of the total surface area of the upper cooking surface. A coining, stamping or pressing method would result in flat upper surface areas that would comprise more than 50% of the total surface area of the upper cooking surface.

It is therefore an object of the present invention to provide an improved one-sided embossing process for the fabrication of textured cookware.

It is yet another object of the present invention to provide an improved frying pan with a durable textured surface that maintains its non-stick qualities longer than the devices taught in the prior art.

Another object of the present invention is to provide an improved combination textured cooking surface/non-stick cooking surface with improved durability.

Other objects and advantages of the invention will become apparent upon reading the following detailed description of the drawings and appended claims, and upon reference to the accompanying drawings.

BRIEF DESCRIPTION OF THE DRAWINGS

The invention is illustrated more or less diagrammatically in the accompanying drawing wherein:

FIG. 1 a schematic diagram of a one-sided embossing manufacturing process for applying a textured surface to one side of a metal sheet for fabricating textured cookware made in accordance with the present invention;

FIG. 2 is a flow diagram of a fabrication and assembly process used to manufacture cookware made in accordance with the present invention.

FIG. 5 is a top plan view of a sheet of cooking surface material before it is fabricated into a cookware item;

FIG. 6 is a top plan view of the cooking surface of a cookware item, in this instance a frying pan, made in accordance with the present invention;

FIG. 7A is a vertical cross-sectional view of the interior surface of the cookware item in a new or an as-manufactured condition; and FIG. 7B a vertical cross-sectional view of the interior surface of a cookware in a condition after an extended period of normal use, particularly illustrating typical wear patterns of the non-stick coating.

Figure 3:
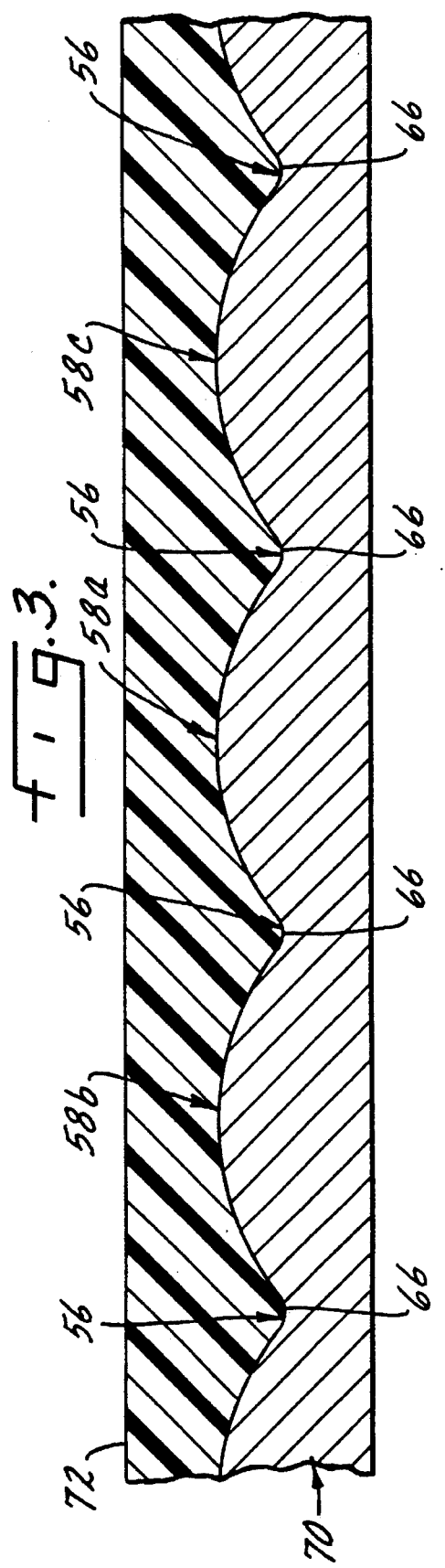
FIG. 3 is an enlarged sectional view of a piece of cookware made in accordance with the present invention illustrating the gentle undulations provided by the one-sided embossing process of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS

Like reference numerals will be used to refer to like or similar parts from Figure to Figure in the following description of the drawings.

The present invention is best understood upon consideration of how cookware items embodying the present invention are made. Turning to FIG. 1, a coil 10 of metal in sheet form is provided on a motor-driven roller 12. The metal 14, under tension imposed by the recoiler 24, passes through a breaker roller 16 before passing through a series of flattening rollers indicated generally at 18. The now straightened and flattened metal 14 passes between the embossing roller 20 and smooth roller 22 and the upper surface 17 of the metal sheet 14 is textured. The embossing or texturing roller 20 is motor driven and the pressure between the embossing roller 20 and smooth roller 22 is preferably controlled hydraulically to control the depth of penetration in the upper surface 17 of the metal sheet 14. The smooth roller 22 is preferably free-wheeling or undriven. The smooth roller 22 is equipped with a wiper or scraper (not shown) in order to keep the bottom roller free of slitter hairs, oxides and metal fines that may be deposited from the underside 15 of the metal sheet 14. The scraper or wiper (not shown) ensures that the roller 22 retains its smooth surface. The textured strip 14 is wound back to a coil form on a power-driven recoiler 24. The recoiler 24 also served to provide needed tension across the metal sheet 14 between the roller 12 and recoiler 24. The coiled textured strip 25 may be delivered to a press for the blank and draw operation indicated at 26 which is used to press the cookware or cooking vessel 28 (see FIG. 6).

Turning to FIG. 2, the textured metal 14 is pressed at 26. Then the cookware is washed in acid or a caustic solution at 30 which is a preparation for the painting step at 32. The cookware 28 is washed in caustic or acid solution in order to roughen up the surface thereof to improve the adherence of paint or coatings to the outside surface. Prior to the painting of the cookware, the handle attachment is welded on at 34. After the painting step at 32, the cookware is baked at 36 and the inside surface of the cookware is pretreated for the application of the interior coating at 38. The step 38 may be combined with step 30. The interior coating is applied at 40 and then the cookware is baked at 42 to cure the interior coating. The upper edge 44 (see FIG. 6) is trimmed at 48 and the handle is attached to the cookware 28 at 50. The cookware 28 is packed and made ready for shipment at 52.

Figure 4:
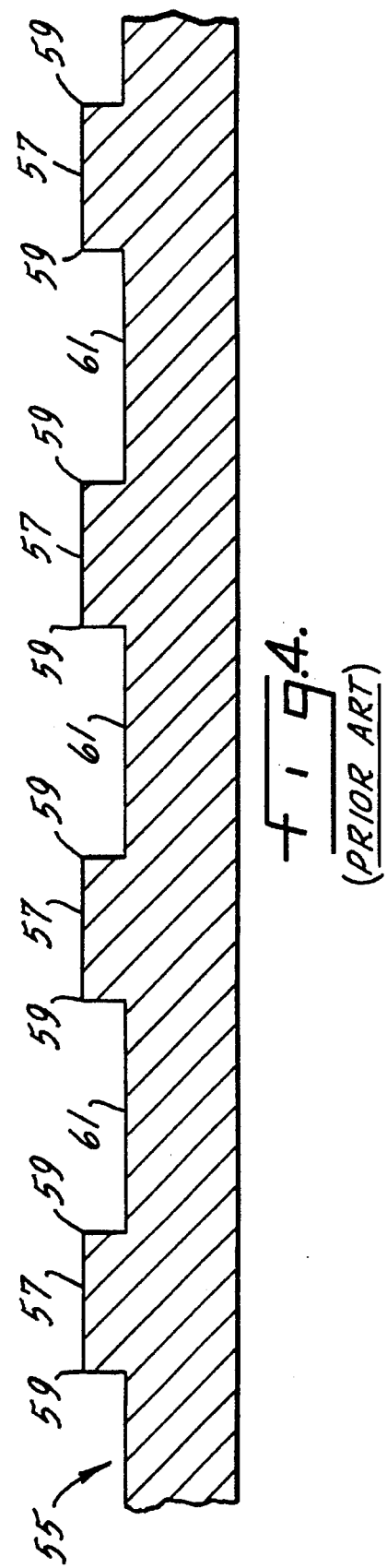
FIG. 4 is a sectional view of a piece of textured cookware made by stamping or coining.

A small portion of the textured surface is illustrated in FIG. 3. The cooking surface 70 is represented by the cross-hatched area; the upper dark area is a cross-section of a pliable resin material that was applied to an actual cooking surface 70. FIG. 3 is a presentation of one narrow raised portion 58a closely disposed between adjacent narrow raised portions 58b, 58c. The raised portions 58a, 58b, 58c disposed between adjacent channels 56 are smooth and include no sharp edges. The raised portions 58a, 58b, 58c represent the geometry of the raised portions 58 disposed between two roots 62 as discussed below with respect to FIG. 5. In contrast, referring now to FIG. 4, a textured surface 55 provided by a stamping operation of the prior art creates a series of channels 61 and protuberances 57 with sharp edges 59.

Turning to FIGS. 5 through 7B, the coated textured surface 70 includes a series of curvilinear channels such as those shown at 56 in FIGS. 5, 6, 7A, and 7B and more specifically at 56a, 56b in FIG. 5. The channels 56a, 56b will be discussed in detail for purposes of illustration and it will be noted that the channels 56a, 56b represent a portion of the continual pattern of channels 56 that extends across the textured surface 70 (see FIG. 6).

Each channel 56a, 56b is wave-like or sinusoidal in configuration and further each channel 56a is one-half a cycle or 180° out of phase with its adjacent channel 56b. The result is a sequence of undulations such as 60a and 60b that extend outward from each other and a sequence of undulations such as 62a and 62b that extend inward toward each other without meeting. The outwardly extending undulations 60a, 60b are also known as lands 60a, 60b and the inwardly extending undulations 62a, 62b are also known as roots 62a, 62b. The narrow raised portion 58 between two roots 62a, 62b is illustrated above in FIG. 3.

Returning to FIG. 5, an elliptical, oblong or oval area 64 is disposed between each pair of lands 60a, 60b. While not illustrated due to the limitations of a two-dimensional drawing, it will be noted that the areas 64 or the raised portions 64 are disposed higher or are of a higher elevation than the areas 58 disposed between two roots. Both the raised portions 64 disposed between two lands such as 60a, 60b and the raised portions 58 disposed between two roots such as 62a, 62b are of a higher elevation than the bottoms 66 of the channels 56 (see FIGS. 3, 7A, 7B). Thus, in terms of vertical elevation, the raised portions 64 are the higher than both the areas 58 between two roots 62 of two channels 56 and the areas 58 are higher than the bottoms 66 of the channels 56.

In the preferred embodiment, the raised portions 64 are disposed between about 0.005" and 0.007" above the bottoms 66 of the channels 56 and preferably not too far above about 0.056" above the bottoms 66 of the channels 56. The elevation of the areas 58 bound by the roots 62 is about 0.002" above the channels 56. The thickness of the non-stick coating should be between about 0.001" and about 0.002" and preferably from about 0.0060" to about 0.0062". The one-sided embossing technique provided by the present invention provides a relatively shallow penetration of 0.008" or a channel bottom 66 depth of 0.008". Further, the one-sided embossing technique provided by the present invention may be employed on relatively thick gauge metal, from 0.098" to 0.128". As noted above, embossing has previously been limited to thinner metal.

Turning to FIG. 6, a piece of ordinary cookware, in this instance a frying pan, is indicated generally at 20. The frying pan 20 includes an exterior side or outer periphery 68. The upper cooking surface, shown generally at 70, includes the texture pattern illustrated by the series of undulating, curvilinear or sinusoidal channels 56. The elliptical raised portions 64 and narrow raised portions 58 and the actual width of the channels 56 is not indicated in FIG. 2 due to the limitations of this type of two-dimensional drawing and reference should be made to FIGS. 5, 7A and 7B as well as this description.

Turning to FIGS. 7A and 7B, examples of a new cooking surface 70 and a used cooking surface 70a are illustrated. In FIG. 7A, the surface 70 includes an even coat of non-stick material 72. The coat of material 72 is evenly distributed over the raised portions 64 disposed between the lands 60 as well as in the grooves or channels 56. In FIG. 3B, the non-stick material 72 has worn off of the raised portions 64 because the raised portions 64 are subject to more frictional contact with food, spatulas, other cooking utensils and cleaning utensils.

However, in FIG. 7B, it will be noted that the channels 56 and the bottoms 66 of the channels 56 still carry a coating of non-stick material 72. Further, .while not shown in FIGS. 7A and 7B, the areas 58 disposed between two roots 62 (see FIG. 1) will also still carry a coating of non-stick material 72 due to the lower elevation of the areas 58 as compared to the raised portions 64. Thus, the non-stick coating 72 disposed in the channels 56 and in the areas 58 will not readily wear off and, in fact, will be protected from cooking and cleaning utensils due to the lower elevation the channels 56 and areas 58 in comparison to the raised portions 64. In effect, the raised portions 64 protect the non-stick material 72 disposed in the channels 56 and areas 58 from wear.

The result is a two-fold benefit. First, only the coating 72 disposed on the raised portions 64 wears first. This initial wear does not unduly compromise the non-stick qualities of the cookware 28 because the raised portions 64 constitute less than one-third and preferably less than 30% of the total surface area of the cooking surface area 70. Thus, after extended use, the pan 28 will still have at least 70% of the non-stick coating 72 left.

Second, the non-stick coating 72 remains in the areas where food is most likely to get lodged and stuck, namely in the channels 56 and in the areas 58 between the roots 62. Thus, even though the non-stick coating 72 wears off of the flat plateau-like like regions 64, the coating will not wear off of the nooks and crannies such as the channels 56 and areas 58.that actually trap the food. With the design disclosed by the present invention, the non-stick, easy-to-clean qualities initially provided by the pan 20 will substantially outlast the useful lives of conventionally coated-textured fry pans.

Although only one embodiment of the present invention has been illustrated and described, it will at once be apparent to those skilled in the art that variations may be made within the spirit and scope of the invention. Accordingly, it is intended that the scope of the invention be limited solely by the scope of the hereafter-appended claims and not by any specific wording in the foregoing description.

I claim:

1. A method of manufacturing textured cookware, the method comprising the steps of:
   a) providing a roll of metallic material;
   b) unrolling the metallic material;
   c) traversing the metallic material between an embossing roller and a smooth roller to impart a textured cooking surface on one side of the metallic material to from a textured strip;
   d) pressing the textured strip to form a piece of cookware whereby the textured cooking surface faces upward for contact with food cooking in said cookware.

2. The method of claim 1 further comprising the following step:
   flattening the metallic material after the unrolling step and before the traversing step.

3. The method of claim 1,
   wherein the textured cooking surface is further characterized as including a series of adjacent curvilinear grooves which are narrow in width and depth, the grooves being disposed in an upper cooking surface of the textured strip in a side-by-side fashion,
   each groove being characterized as a series of alternating and oppositely directed undulations, each groove and the groove adjacent to it further being characterized as a series of alternating roots and lands, the lands of each groove and the lands of each adjacent groove being defined as adjacent undulations that curve outwardly from each other, the roots of each groove and the roots of each adjacent groove being defined as adjacent undulations that curve inwardly toward each other without meeting,
   a portion of the cooking surface disposed between two adjacent lands being further characterized as including a raised portion, two adjacent grooves providing a series of raised portions disposed between the adjacent lands that are disposed between alternating adjacent roots.

4. A method of manufacturing textured cookware, the method comprising the steps of:
   a) providing a roll of metallic material mounted on an uncoiling roller;
   b) feeding one end of the metallic material between an embossing roller and a smooth roller;
   c) attaching said one end of the metallic material to a recoiling roller;
   d) applying tension across the metallic material by applying torque to the recoiling roller;
   e) unrolling the metallic material;
   f) traversing the metallic material between an embossing roller and a smooth roller to impart a textured cooking surface on one side of the metallic material to form a textured strip;
   g) recoiling the textured strip on the recoiling roller.

5. The method of claim 4,
   wherein the feeding step further comprises feeding the metallic material across a breaker roller and through a series of flattening rollers before feeding the metallic material between the embossing roller and the smooth roller.

6. The method of claim 5, further comprising the following steps:
   h) pressing the textured strip to form a piece of textured cookware with said textured cooking surface;
   g) washing the piece of textured cookware in an acidic solution to roughen an inner and outer surface thereof;
   h) applying an outer coating the outer surface of the textured cookware;
   i) curing the outer coating;
   j) applying a non-stick coating to the textured cooking surface of the textured cookware;

k) curing the non-stick coating.

7. The method of claim 6, wherein the textured cooking surface is further characterized as including a series of adjacent curvilinear grooves which are narrow in width and depth, the grooves being disposed in an upper cooking surface of the textured strip in a side-by-side fashion, each groove being characterized as a series of alternating and oppositely directed undulations, each groove and the groove adjacent to it further being characterized as a series of alternating roots and lands, the lands of each groove and the lands of each adjacent groove being defined as adjacent undulations that curve outwardly from each other, the roots of each groove and the roots of each adjacent groove being defined as adjacent undulations that curve inwardly toward each other without meeting, a portion of the cooking surface disposed between two adjacent lands being further characterized as including a raised portion, two adjacent grooves providing a series of raised portions disposed between the adjacent lands that are disposed between alternating adjacent roots.

8. The method of claim 7, wherein the raised portions are elliptical in configuration.

9. The method of claim 8, wherein the raised portions are further characterized as having two opposingly directed narrow ends, the narrow ends being directed toward two roots of two adjacent grooves.

10. The method of claim 9, wherein the raised portions are further characterized as comprising between 20 and 30 percent of the total surface area of the upper cooking surface.

11. The method of claim 10, wherein the raised portions are further characterized as comprising less than 30 percent of the total surface area of the upper cooking surface.

12. An improved method of fabricating cookware, the method comprising:

embossing a textured cooking surface on a metal surface, the metal surface being provided in roll form, the textured cooking surface further characterized as including a series of adjacent curvilinear grooves which are narrow in width and depth, the grooves being disposed in the metal surface in a side-by-side fashion, each groove being characterized as a series of alternating and oppositely directed undulations, each groove and the groove adjacent to it further being characterized as a series of alternating roots and lands, the lands of each groove and the lands of each adjacent groove being defined as adjacent undulations that curve outwardly from each other, the roots of each groove and the roots of each adjacent groove being defined as adjacent undulations that curve inwardly toward each other without meeting, the portions of the metal surface disposed between two adjacent lands being further characterized as including a raised portion, two adjacent grooves providing a series of raised portions disposed between the adjacent lands that are disposed between adjacent roots;

forming the metal surface into a desired cookware shape with the textured cooking surface facing upwardly;

applying a coating of non-stick material to the textured cooking surface, whereby the non-stick material disposed on top of the raised portions will engage cooking utensils, cleaning utensils and food to a greater extent than the non-stick material disposed in the grooves and between adjacent roots or between adjacent raised portions.

* * * * *